(12) United States Patent
Takizawa et al.

(10) Patent No.: US 7,899,557 B2
(45) Date of Patent: Mar. 1, 2011

(54) INPUT SIGNAL ANALYZING SYSTEM AND CONTROL APPARATUS USING SAME

(75) Inventors: Masahiro Takizawa, Tokyo (JP); Kazuyoshi Ishigaya, Tokyo (JP); Kunio Ootani, Tokyo (JP)

(73) Assignee: ASM Japan K.K., Tokyo (JP)

( * ) Notice: Subject to any disclaimer, the term of this patent is extended or adjusted under 35 U.S.C. 154(b) by 1765 days.

(21) Appl. No.: 11/069,599

(22) Filed: Mar. 1, 2005

(65) Prior Publication Data

US 2006/0218312 A1    Sep. 28, 2006

(51) Int. Cl.
*G06F 19/00*    (2006.01)

(52) U.S. Cl. ............................... 700/5; 700/24; 700/108

(58) Field of Classification Search .................. 700/4, 5, 700/24, 55, 108; 702/188, 190; 710/20
See application file for complete search history.

(56) References Cited

U.S. PATENT DOCUMENTS

| | | | | |
|---|---|---|---|---|
| 5,581,705 A | * | 12/1996 | Passint et al. | 709/200 |
| 5,893,162 A | * | 4/1999 | Lau et al. | 711/153 |
| 5,896,292 A | * | 4/1999 | Hosaka et al. | 700/108 |
| 2003/0018858 A1 | * | 1/2003 | Hanawa | 711/147 |

OTHER PUBLICATIONS

Dan Appleman, "Visual Basic Programmer's Guide to the Win32 API, The Authoritative Solution," pp. 975-980 (1999).

* cited by examiner

*Primary Examiner* — Ryan A Jarrett
(74) *Attorney, Agent, or Firm* — Knobbe Martens Olson & Bear LLP

(57) ABSTRACT

For example, by providing MMF software 10, 11 transferring data using a memory-mapped file respectively in a semiconductor manufacturing apparatus 1 and in an input signal analyzing system 8, data transfer load placed on control software 4 and analyzing software 9 is reduced. Additionally, in the MMF software 10, by inserting counter information in the memory-mapped file and by observing the information by the MMF software 11, communication abnormality is detected.

22 Claims, 9 Drawing Sheets

INPUT SIGNAL ANALYZING SYSTEM AND CONTROL APPARATUS USING SAME

BACKGROUND OF THE INVENTION

1. Field of the Invention

The present invention relates to a control apparatus and a signal analyzing system; particularly to a control apparatus and a signal analyzing system on which software with reduced data transfer load capability operates.

2. Description of the Related Art

FIG. 10 shows a conventional control apparatus using a semiconductor manufacturing apparatus as an example. In FIG. 10, numeral 1 denotes a control apparatus using a semiconductor manufacturing apparatus as an example; the control apparatus comprises a signal input means 2 such as a sensor and a measuring instrument detecting/measuring a pressure, a temperature, etc. inside the control apparatus, an analog-digital signal converter 3 for quantifying an analog signal inputted, control software 4 for calculating control result from the input signal quantified, and a control means 5 actually performing control based on control result. Numeral 6 denotes a conventional input signal analyzing system, and numeral 7 denotes analyzing software which operates within the input signal analyzing system 6.

In the field of semiconductor manufacturing, there are needs for analyzing a signal inputted from the signal input means 2 such as sensors or measuring instruments, for the purposes of maintenance or failure analysis in addition to its intended purpose which is control by a control means.

For this reason, there is a method for connecting each sensor or measuring instrument 2 to an analyzer such as an X-Y recorder by direct wiring. However, this method has problems in that wiring becomes cumbersome and time required for wiring increases, as the number of sensors or measuring instruments needed to be analyzed increases.

As a method for solving these problems, there is a system called "Manufacturing Execution System (MES)" if a control apparatus 1 shown in FIG. 10 is a semiconductor manufacturing apparatus. Using this system, a signal inputted to multiple sensors or measuring instruments can be transferred to the outside of the control apparatus by only one communication cable in a software-like manner. The MES is an analyzing system shown as numeral 6 in FIG. 10, and it is a worldwide-known standard system as a system attached to a semiconductor manufacturing apparatus.

When the MES is used, a signal inputted from a signal input means 2 such as a sensor and a measuring instrument is converted to numerical data by an analog-digital signal converter 3, is temporarily placed in a data area in control software 4, is data-converted by a conversion driver included in the control software 4, and is transferred to analyzing software 7 operating on the analyzing system 6.

As a widely prevalent system, the MES has many features and the following characteristics:

This data transfer system is a robust system that it always sends back an acknowledgement to every received outgoing message.

Its message data structure is built using a list structure, and a communication interface or a conversion driver for analyzing the list structure is always required on the message-sending side and on the message-receiving side.

Because the MES 6 has the characteristics described above, it has the following problem: If it is used for signal analysis of the signal input means 2 such as a sensor or a measuring instrument, load on the conversion driver increases as data volume increases, which exerts an influence on operations of the control software 4 and the analyzing system 6; if things come to the worst, the control apparatus or the signal analyzing system is halted.

SUMMARY OF THE INVENTION

In view of the above-mentioned problem, according to one embodiment of the present invention, by using a system which shares input signal data by blocking transfer data both on the control apparatus side and on the analyzing system side, mass input signal data can be transferred to the analyzing system at high speed. Additionally, in one embodiment of the present invention, by inserting counter information in a transfer data block, data reliability can be easily maintained and apparatus stability can be ensured. Additionally, in one embodiment, by inserting counter information in one transfer data block at its head and at its end, not only data reliability of a transfer data block per transfer, but also data reliability of within one transfer data block can be ensured.

According to one embodiment of the present invention, provided is a signal analyzing system, which comprises:
a control unit which receives input signal data and outputs the data to a control apparatus;
a control signal data blocking unit which blocks information in a data-analyzing area of the input signal data and transfers it as a control signal data block;
an analytic signal data blocking unit which creates an analytic signal data block for signal analysis use based on the control signal data block transferred; and
a signal analyzing unit which analyzes the input signal data based on the analytic signal data block.

The above-mentioned embodiment further includes at least the following embodiments;

The signal analyzing system, wherein the control signal data blocking unit and the analytic signal data blocking unit comprise common data blocking application software;

The signal analyzing system, wherein the control signal data blocking unit writes a control signal data block transferred to a file on the analytic signal data blocking unit; and the analytic signal data blocking unit reads in the analytic signal data block from the file;

The signal analyzing system, wherein the file used for the control signal data block and the analytic signal data block is a memory-mapped file;

The signal analyzing system, wherein the control signal data block has information on the input signal data and counter information;

The signal analyzing system, wherein the counter information is given by the control signal data blocking unit and is incremented every time a control signal data block is created;

The signal analyzing system, wherein the counter information is inserted at least in one place in the control signal data block; the analytic signal data blocking unit detects change in the counter information; from this, abnormality in communication between the control signal data blocking unit and the analytic signal data blocking unit is detected;

The signal analyzing system, wherein the counter information is inserted in two places, at the head and at the end of the control signal data block; the analytic signal data blocking unit detects change in the counter information at the head and at the end; from this, abnormality in communication between the control signal data blocking unit and the analytic signal data blocking unit is detected;

The signal analyzing system, wherein the same variable is used for the counter information inserted at the head and at the end;

The signal analyzing system, wherein the control signal data blocking unit and the analytic signal data blocking unit are called at every given time period.

In the above, respective elements in one embodiment can apply to different embodiments or can apply in combination with other elements.

Additionally, according to an alternative embodiment of the present invention, provided is a manufacturing apparatus system, which comprises:

a signal input portion;

the signal analyzing system described in claim 1 for receiving input signal data from the signal input portion; and a control apparatus controlled by an output signal from the control unit of the signal analyzing system.

As the above-mentioned manufacturing apparatus, a semiconductor manufacturing apparatus comprising a temperature-regulator inside a reactor, a pressure-regulator, a gas flow-rate controller, a transfer robot as the control apparatuses can be mentioned, but the present invention is not limited thereto.

Furthermore, the present invention can apply to a method. In one embodiment, provided is a signal analyzing method comprising the steps of:

receiving input signal data for a control apparatus;

creating a control signal data block from information in a data-analyzing area of the input signal data and specifying the block;

creating an analytic signal data block for signal analysis use based on the control signal data block; and analyzing the input signal data based on the analytic signal data block.

The above-mentioned embodiment can further include the following aspects:

The signal analyzing method, wherein the analytic signal data block is created by writing the control signal data block transferred to a file, and reading in the analytic signal data block from the file;

The signal analyzing method, wherein the file used for the control signal data block and the transfer data block for signal analysis use is a memory-mapped file;

The signal analyzing method, wherein to the control signal data block, information on the input signal data and counter information are given;

The signal analyzing method, wherein the counter information is incremented every time the control signal data block is created;

The signal analyzing method, wherein the counter information is inserted at least, in one place in the control signal data block; change in the counter information in the analytic signal data block created from the control signal data block is detected; from this, communication abnormality is detected;

The signal analyzing method, wherein the counter information is inserted in two places, at the head and at the end of the control signal data block; change in the counter information in the analytic signal data block created from the control signal data block is detected; from this, communication abnormality is detected;

The signal analyzing method, wherein the counter information at the head and at the end has the same variable;

The signal analyzing method, wherein the steps of creating a control signal data block and creating an analytic signal data block are called at every given time period;

The signal analyzing method, wherein the control apparatuses comprise a temperature-regulator inside a reactor, a pressure-regulator, a gas flow-rate controller, and a transfer robot in a semiconductor manufacturing apparatus; and input signal data is input signals inputted to respective control apparatuses.

In at least one embodiment of the present invention, of the above-mentioned objects and effects, one or more are to be achieved. The present invention, however, is not limited to the above-mentioned objects and effects; and all the above-mentioned objects and effects are not necessarily achieved in embodiments of the present invention.

As described above, according to one embodiment of the present invention, in a signal analyzing system attached to a control apparatus, a data conversion driver conventionally attached can be removed; data transmission process load on the control apparatus side and on the signal analyzing system sides is reduced, and stable signal analysis in real time with the control apparatus running becomes possible.

Additionally, in one embodiment of the present invention, by the counter information inserted in a transfer data block, occurrence of communication abnormality per data block, or communication abnormality in the middle of data block update can be detected.

Using the above-mentioned method, quality of data transferred from a control apparatus to a signal analyzing system can be ensured.

BRIEF DESCRIPTION OF THE DRAWINGS

Although drawings attached show embodiments according to the present invention, the present invention is not limited to these embodiments. The drawings are oversimplified for illustration purposes.

Figure 1:
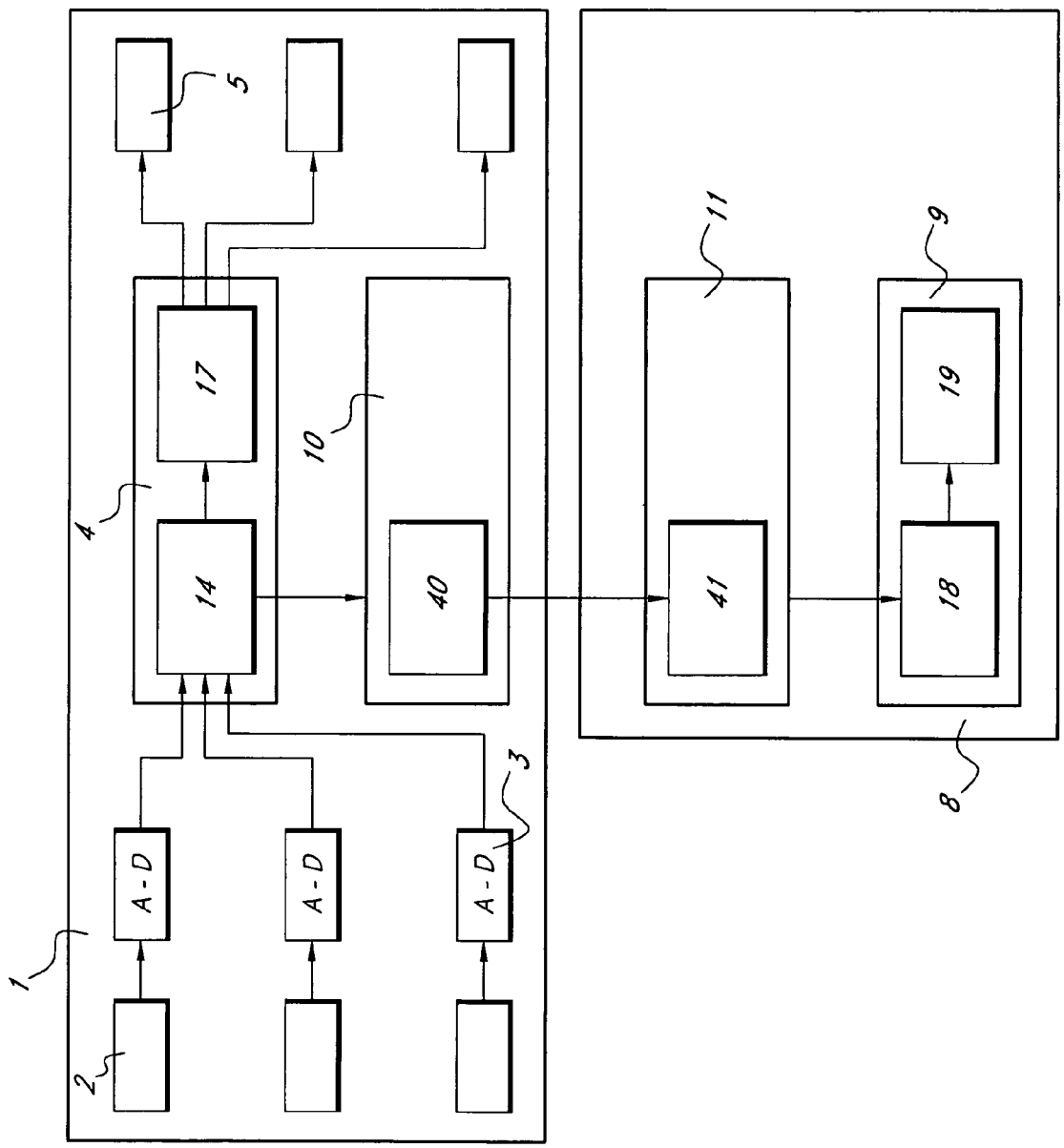
FIG. 1 is a schematic view showing one configuration example of a semiconductor manufacturing apparatus and an input signal analyzing system according to one embodiment of the present invention.

Explanation of Symbols Used: 1: Semiconductor manufacturing apparatus, 2: Signal input apparatus, 3: Analog-digital signal converter, 4: Control software, 5: Control apparatus, 6: Analyzing system (MES), 7: Analyzing software, 8: Analyzing system (EES), 9: Analyzing software, 10: MMF Write software, 11: MMF read software, 12: Conversion driver, 14: Data area, 15: Data block, 17: Output control portion, 18: Data area, 19: Analyzing portion, 40: Data block A, 41: Data block B, 43: Real file.

DETAILED DESCRIPTION OF THE PREFERRED EMBODIMENT

In one embodiment of the present invention, by arranging application software, which can share signal data, on the control apparatus side and on the analyzing system side respectively, and by specifying a transfer data block using respective memory blocks, data is transmitted. Because file information can be treated as a memory block, there is no need for specifying a communication format; a transfer data block can be created on the control apparatus side and on the analyzing system side by specifying a handle name or an object name, which specifies a transfer data block, and the transfer data block created can be used as a memory block by a designated program provided on each side. By this, data transmission load is reduced.

The above-mentioned data transmission system can be implemented on various operating systems, not on a particular operating system. It can be created using the Application Programming Interface (API) provided by an operating system used.

As there are various (specific or general) API design models, it is not limited to a specific model. For example, Win32API, an API provided by Microsoft's operating system, Windows, can be used. Not limited to it, BIOS call interface, CORBA, UNIX, Jave2Platform, UPNP (Universal Plug and Play), etc. can be used accordingly.

The control apparatus side and the analyzing system side can be connected using an API, and data transmission between them can be implemented by transfer data block format. A "file" is normally stored on a disk; in order to send data in file format, data relating to a communication format must be transferred in addition to information that is actually used; consequently, data volume increases and sending/receiving load increases. As against this, a transfer data block is mapped in virtual memory and is used as a memory block. As to mapping, for example, in the case of Win32, using features of CreateFileMapping, MapViewOfFile, and UnmapViewOfFile, Windows NT pagefile can be used as a memory-mapped file (MMF). In this specification, a "data block" or a MMF may be simply referred as a "file".

A MMF also functions with other operating systems' APIs than Microsoft's; MMF features of the same sort are provided, for example, by LINUX.

Other than the MMF, mapping can be implemented by SOCKET, DDE, PIPE, DCOM, OLE, etc.

By using a MMF, an address space is reserved, and a physical storage can be mapped in this space. When the file is mapped, a program can access it as if the entire file exists in the memory. Additionally, a MMF can be created using a transfer data block existing in a memory block as well as using an existing file on a disk. Consequently, in one embodiment, a MMF can be created from input signal data existing on a disk on the control apparatus side; and on the analyzing system side, a MMF can be created from the MMF created on the control apparatus side; the MMF on the analyzing system side can be specified using a string (handle) created when the MMF is created. Consequently, the analyzing system side can create a MMF based on the string by mapping the MMF created on the control apparatus side in an address space. An analyzing program on the analyzing system side can use original file information as a memory block.

The present invention is not limited to the above-mentioned, for example, MMF features using Win32 are as follows (See "Visual Basic Programmer's Guide to the Win32 API" by Dan Appleman by SAMS, 1999, at 980.):

CreateFileMapping: Creates a file mapping object.
FlushViewOfFile: Ensures that all changes to a file mapping have been written.
MapVieOfFile/MapVieOfFileEx: Maps a file mapping object into the address space of the current process.
OpenFileMapping: Opens an existing file mapping object.
UnmapViewOfFile: Unmaps a file mapping object from the address space of the current process.

As just described, in one embodiment, by adding memory-mapped file software (referred to as "MMF software") to both a control apparatus and an analyzing system specialized for analyzing signals (as a system attached to a semiconductor manufacturing apparatus, it is known as Equipment Engineering System (EES).), and by removing a conventional conversion driver or a communication interface, stable control software and analyzing system, which reduce data transfer load easily and can analyze signals at real time with the control apparatus in operation, can be provided. Although processing speed varies with conditions, for example, a CPU used, how software is built, etc., in one embodiment using a MMF, 500 bytes of data can be transmitted at 100 ms or less while it takes approx. 300 ms for transferring 500 bytes of data using a conventional MES.

As a system which can share memory on the control apparatus side and on the signal analyzing system side, one embodiment of a MMF using an API provided by Microsoft's operating system is described below. The present invention, however, is not limited thereto.

On the control apparatus side, a file-creating unit for writing input signal data to a file on a disk is provided. Further on the control apparatus side, MMF software for creating a MMF by mapping file data stored on the disk in an address space (referred to as "MMF Write software") is provided. A handle corresponding to the MMF is also created by the MMF Write software. On the signal analyzing system side, MMF software for creating a MMF by mapping the MMF being mapped and written in the address space on the control apparatus side in an address space on the analyzing system side based on the handle (referred to as "MMF Read software") is provided. Further on the signal analyzing system side, analyzing software for analyzing data using the MMF read is provided. Additionally, in the MMF Write software, software for inserting counter information in the MMF is included; in the MMF Read software, software for observing the counter information is included. Except differences described above, the MMF Write software and the MMF Read software can be configured in the same software.

Additionally, although the file-creating unit is provided in the above-mentioned embodiment, the file-creating unit may be eliminated by using a feature of Write software (not limited to the MMF Write software), because the Write software can create a MMF from a memory area, not only from a file. In this case, information in a data analyzing area may be blocked from a memory area (date area) in the control software as a data block.

An example of counter information is shown below, but counter information is not limited to this example. For example, by inserting counter information being incremented by a loop when the MMF Write software creates a data block from signal data, in the file at least in one place, the MMF Read software observes the counter information continuously. If no change has occurred in the counter from a certain point of time, occurrence of communication abnormality of some sort can be detected. Similarly, by inserting counter information being incremented when the MMF Write software creates a data block from signal data, in the file at its head and at its end, the MMF Read software observes the counter information inserted in two places. With that, data transfer if taking place in the middle of update can be detected from discrepancy in values in two counters. Using the above-mentioned two methods, quality of data transferred from the control apparatus to the signal analyzing system can be ensured.

Additionally, by setting to have the MMF Write software and the MMF Read software called every given time frame successively (by setting a function through an API), a running period can be set if desired. By this, signal data can be transferred from the control apparatus to the analyzing system successively.

The MMF Write software and the MMF Read software are implemented using an API provided by Microsoft's operating system.

Preferred embodiments of the present invention are described in detail below with reference to the drawings. The present invention is not limited to these embodiments.

Figure 10:
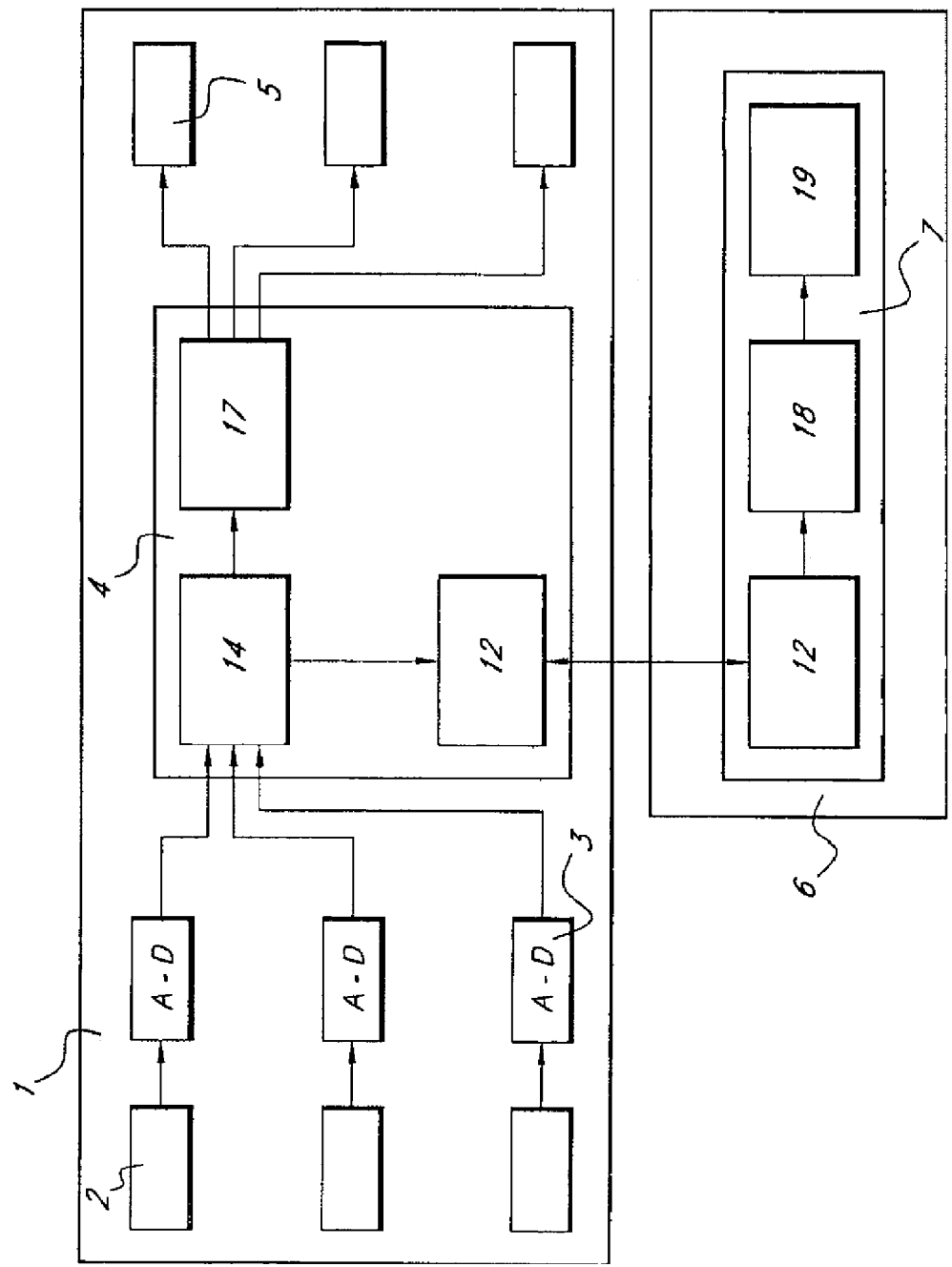
FIG. 10 is a view showing an outline of a conventional control apparatus and a conventional input signal analyzing system using a semiconductor manufacturing apparatus as an example.

FIG. 1 shows one configuration example of a control apparatus and a signal analyzing system in the embodiment of the present invention. In FIG. 1, portions different from a conventional semiconductor manufacturing apparatus shown in FIG. 10 are MMF Write software 10 operating within the semiconductor manufacturing apparatus 1, and MMF Read software 11 operating within the analyzing system 8 specialized for signal analysis.

In other words, the embodiment comprises a semiconductor manufacturing apparatus 1 and an analyzing system 8; the semiconductor manufacturing apparatus 1 comprises a signal input apparatus 2 and an analog-digital signal converter 3 subsequently connected to the signal input apparatus 2, control software 4 for outputting data to the MMF Write software 10 as well as inputting input signal data from the analog-digital signal converter 3 and outputting control signals to a control apparatus 5, the control apparatus 5, and the MMF Write software 10. Additionally, the control software 4 comprises an output control portion 17 for outputting control signals, and a data area output portion 14 for determining a data area to be used based on input signal data and outputting data to the output control portion 17 and the MMF Write software 10. Additionally, a file-creating unit (not shown) for storing a data area having been analyzed on a disk is also included in the control software 4.

The MMF Write software 10 creates a data block 40 based on a real file (a file on the disk) created by the file-creating unit (When a file-creating unit is not provided, a data block is created from a memory area in the control software.). The MMF Read software 11 creates a data block 41 based on the data block 40 created by the write side. The content of the data block 41 is the same as that of the data block 40, but the data block 41 is physically different from the data block 40. In this manner, without transferring a file actually, data can be shared by using a memory-mapped file. The analyzing software program 9 is able to analyze data using the data block 41.

Figure 7:
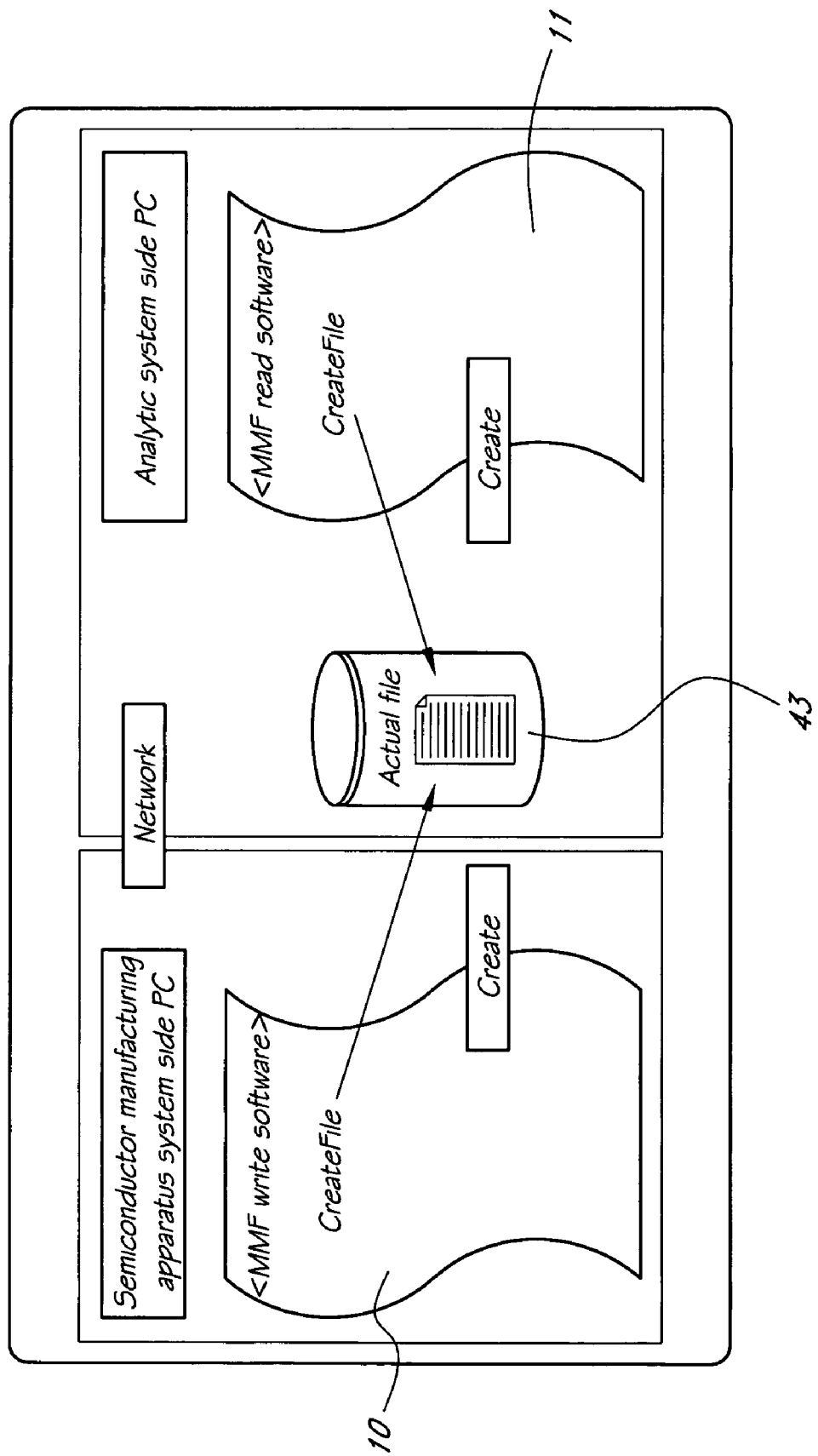
FIG. 7 and FIG. 8 are schematic views showing preparation process for data transfer in one embodiment of the present invention.
Figure 8:
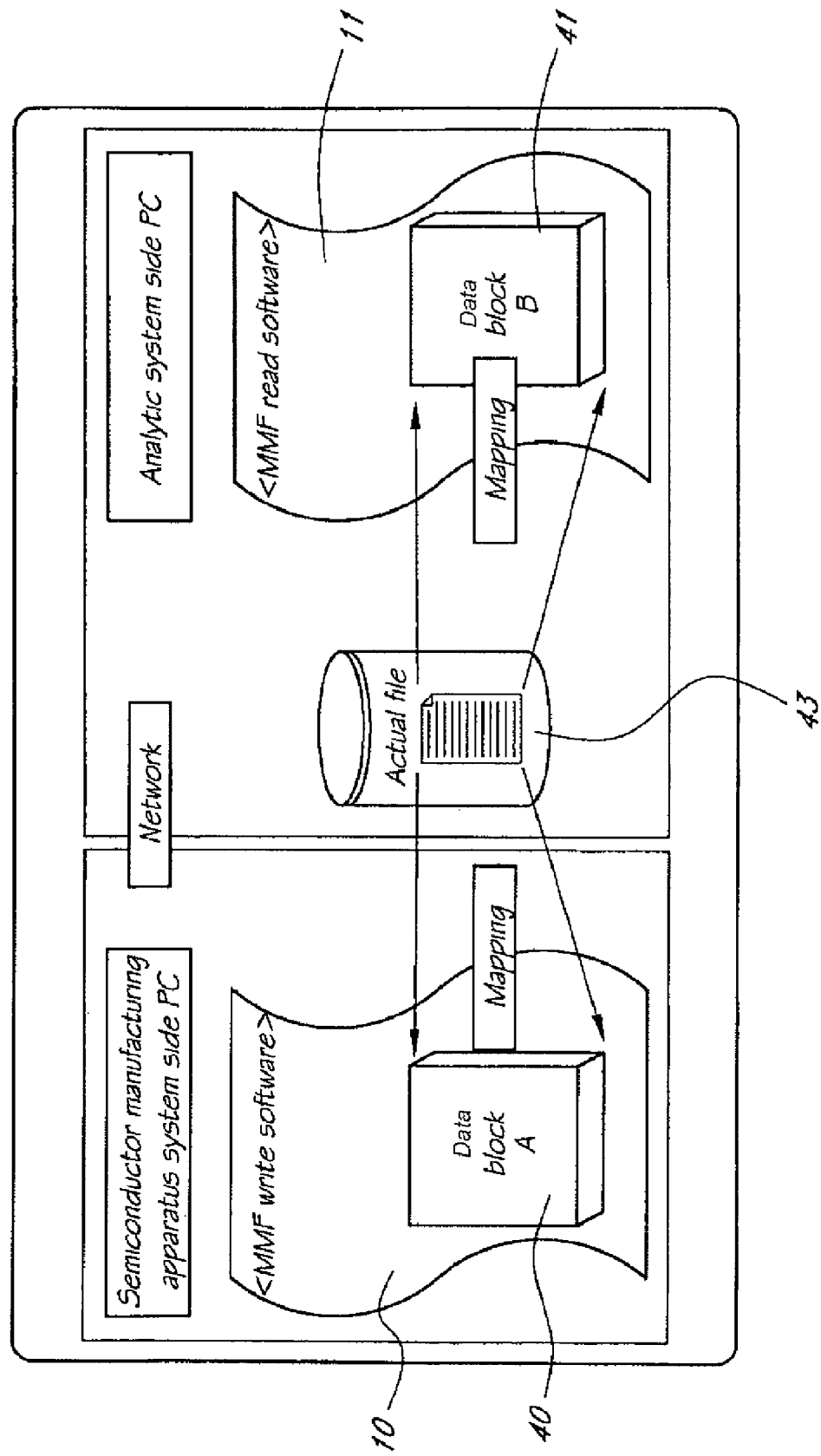

FIG. 1 is a conceptual diagram of data transfer. Typically, the control apparatus side and the analyzing system side comprise different systems or different PCs and are networked. In one embodiment, preparation process for data transfer between different systems is executed. FIG. 7 and FIG. 8 are schematic views showing one example of this case, which are conceptualized for illustration purposes and excessively simplified. These diagrams do not limit the present invention.

Although this is an example of a MMF using Microsoft's API, any forms may be used if data block transfer between different systems is possible or any API can be used.

First, a file (a real file) which can be commonly used by a PC on the control apparatus side and a PC on the analyzing system side is created on a HDD of the PC on the analyzing system side. Because a real file which can be shared is provided on the PC on the analyzing system side, data from the control apparatus side can be transferred to the analyzing system side in data block form. In other word, in FIG. 7, the real file 43 which the MMF Write software 10 on the control apparatus side and the MMF Write software 111 on the analyzing system side can use is created on the PC on the analyzing system side. By this, the MMF Write software 10 is able to write data to the real file 43 by transferring a data block; and the MMF Read software 11 is able to read the data block as it is from the real file 43.

The real file can be created by either of the MMF Write software 10 or the MMF Write software 11; whichever is started up earlier can create the real file (Additionally, the file can be created using CreateFile function, etc.; functions provided in each software and flowcharts are described later.). Additionally, in the preparation stage, no data is stored in the real file.

Next, as shown in FIG. 8, the real file 43 is mapped as a data block in address spaces of respective systems (PCs). By this, the real file 43 and the data block 40, and the real file 43 and the data block 41 are synchronized, and it becomes possible to write the data block 40 to the real file 43, and to read the data block 41 from the real file 43.

Additionally, this preparation process is executed only once when MMF features are started. If the file already exists, executing this preparation process again is not necessary. In this case, CreateFile function is called to open the file.

Figure 9:
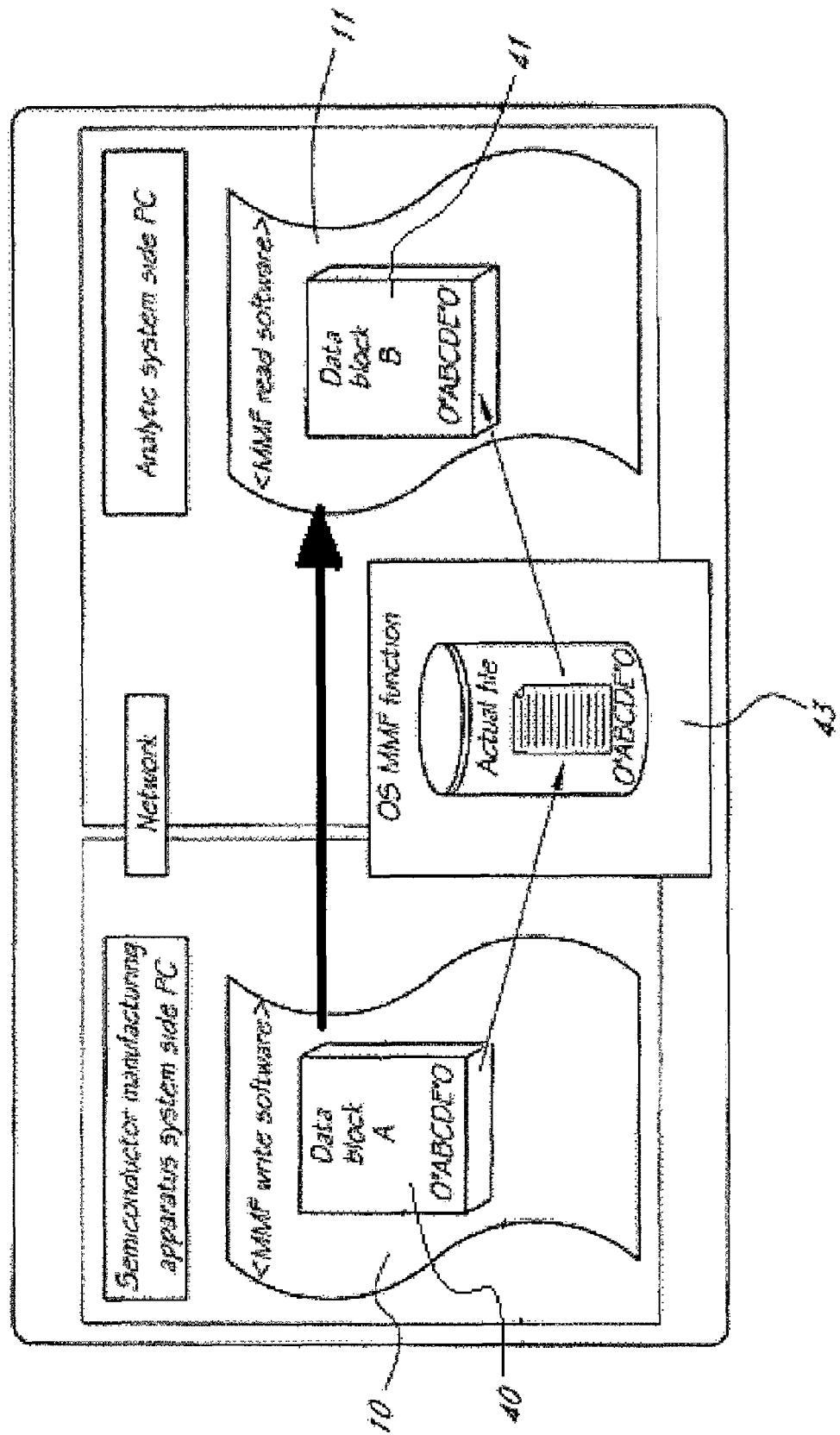
FIG. 9 is a schematic view showing data transfer process in one embodiment of the present invention.

After the preparation process, transfer process is executed. FIG. 9 is a schematic view showing one example of transfer process, which is conceptualized for illustration purposes and excessively simplified. These diagrams do not limit the present invention.

First, the MMF Write software 10 sets information, e.g., "ABCDE", in a data area, which the information has been stored as a file created by the control software (a file-creating unit) as Data Block A (40) in an address space on a PC on the write side (As described later, this can be executed using FlushViewOfFile function, etc.). At this time, in one embodiment, by setting, for example, the head counter "0" and the end counter "0", "0'ABCDE'0" is set in the Data Block A (A flowchart of the counter is described later.). Next, the Data Block A is transferred by the MMF Write software to the real file 43 created on the PC on the analyzing system side. The MMF Read software 11 sets the information "0'ABCDE'0" of the Data Block A, which was transferred to the real file 43, in Data Block B (41) set in its own address space (on the PC on the analyzing system side); by this, it becomes possible to use the data "0'ABCDE'0" on the analyzing system side. The above-mentioned process can be implemented by the MMF feature; as a result, it becomes possible that the same data in the Data Block A appears in the Data Block B.

In the embodiment described above, the MMF Write software inserts update counters (for example, 0-255) before and after a transfer data block so that current counter values of the counters are increased every time data is updated. The MMF Read software can determine whether data is new or not by confirming whether counter values in the Data Block B have been updated or not. Additionally, by inserting counters before and after a data block, whether there is abnormality in the data block transferred by one transfer operation or not can be confirmed.

The function can be set so that the above-mentioned transfer process can be executed regularly at intended intervals. Additionally, although the analyzing software can use the information in the Data Block B as information on the memory, the information in the Data Block B; can also be stored in a file by separately creating the file.

Additionally, the above-mentioned framework like the one shown in FIG. 1 is a conceptual framework, and does not indicate a physical configuration. The output control portion 17 may be arranged outside the control software 4. The MMF Write software 10 may be included in the control software 4. It is preferred, however, that a MMF is operated separately from the control software; by this, data block transfer without placing a burden on the control software becomes possible.

Additionally, as input signals, in the semiconductor manufacturing apparatus, for example, temperature information from a temperature controller, coordinate data of a transfer robot, pressure data inside a reactor, a gas flow rate of a mass flow controller, etc. can be mentioned. Other than the semiconductor manufacturing apparatus, for example, input signals of the same sort are used in a liquid crystal manufacturing apparatus; e.g., pressure, temperature, gas flow rate, etc. can be mentioned. Additionally, in a magnetic disk manufacturing apparatus, plasma output, etc. in the case of a sputter method, temperature, the number of rotations, a liquid amount, etc. in the case of a sol-gel method can be treated as input signal data.

In FIG. 1, the MMF Write software 10 and the MMF Read software 11 are application programs running on Microsoft's operating system. For example, they are included in Windows 95, Windows XP, etc. Additionally, both use the API provided by Microsoft's operating system.

When the control software comprises a file-creating unit, the file-creating unit specifies a data portion to be analyzed from the data area output portion 14 of the control software 4, and creates a file (to store data on a disk). Data stored in the file is memory-mapped by the MMF Write software 10 regularly at a predetermined cycle. When the data is memory-mapped, an object is created, and a location in an address space is specified. The object is specifically a handle (head pointer) or a string, etc.

The analyzing system 8 comprises the MMF Read software 11 and the analyzing software 9. The analyzing software 9 comprises a data area input portion 18 and an analyzing portion 19. Additionally, the above-mentioned framework shown in FIG. 1 is a conceptual framework, and does not indicate a physical configuration. The analyzing portion 19 may be arranged outside the analyzing software 9. The MMF Read software 11 may be included in the analyzing software 9. It is preferred, however, that a MMF is operated separately from the analyzing software; by this, file transfer without placing a burden on the analyzing software becomes possible.

A MMF created on the control apparatus side by the MMF Write software 10 is specified by the MMF Read software 11 on the analyzing system side, and a MMF is created in an address space. By this, file data created by the file-creating unit on the control apparatus side (data on the memory if the file-creating unit is not provided) has been transferred to the analyzing system side (which is referred to as "file transfer"). Data (MMF) read by the MMF Read software 11 is stored in the data area input portion 18 in the analyzing software 9.

Figure 2:
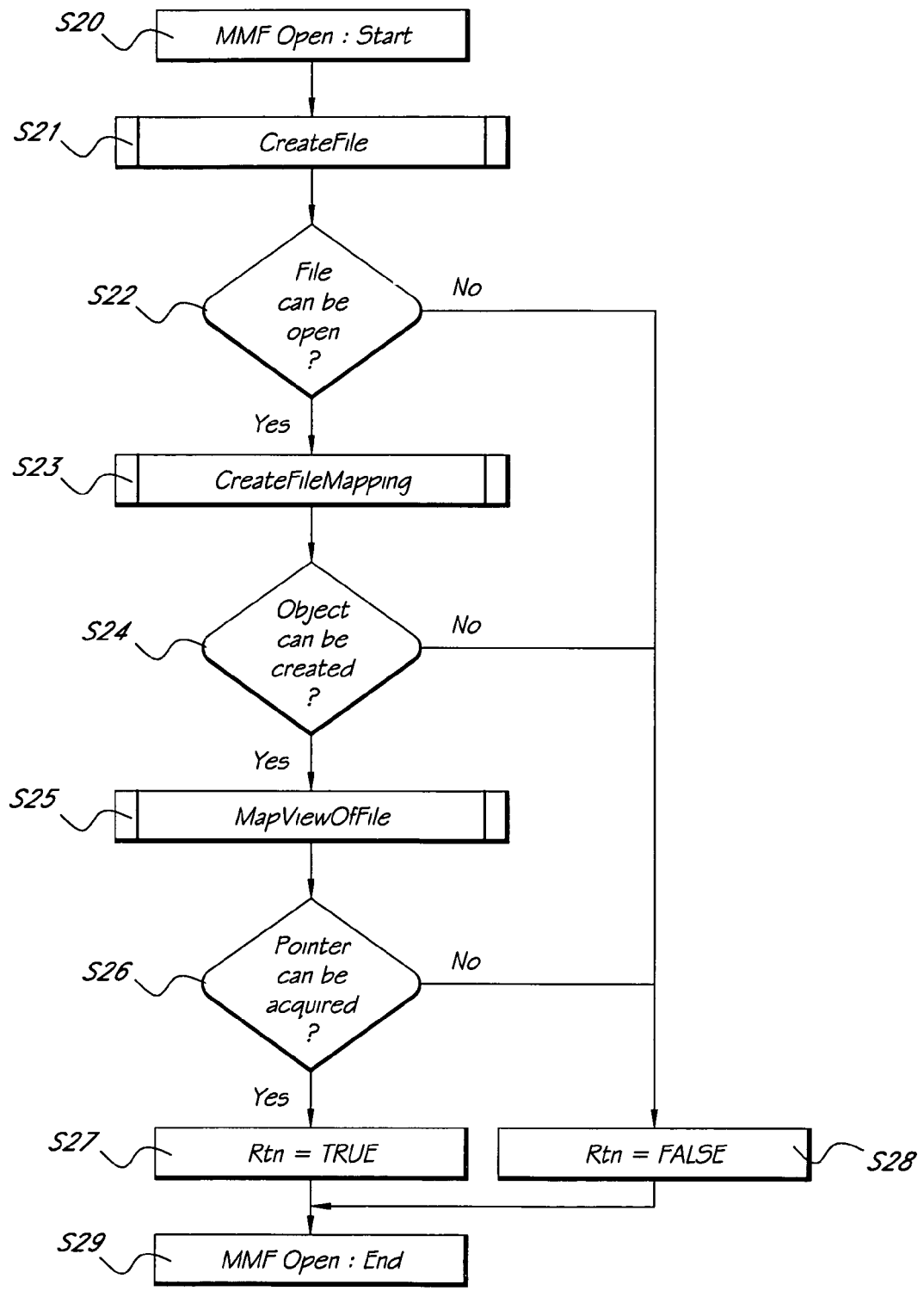
FIG. 2 is a flowchart showing features of MMF Open subroutine of MMF software running on the semiconductor manufacturing apparatus and the analyzing system according to one embodiment of the present invention.
Figure 3:
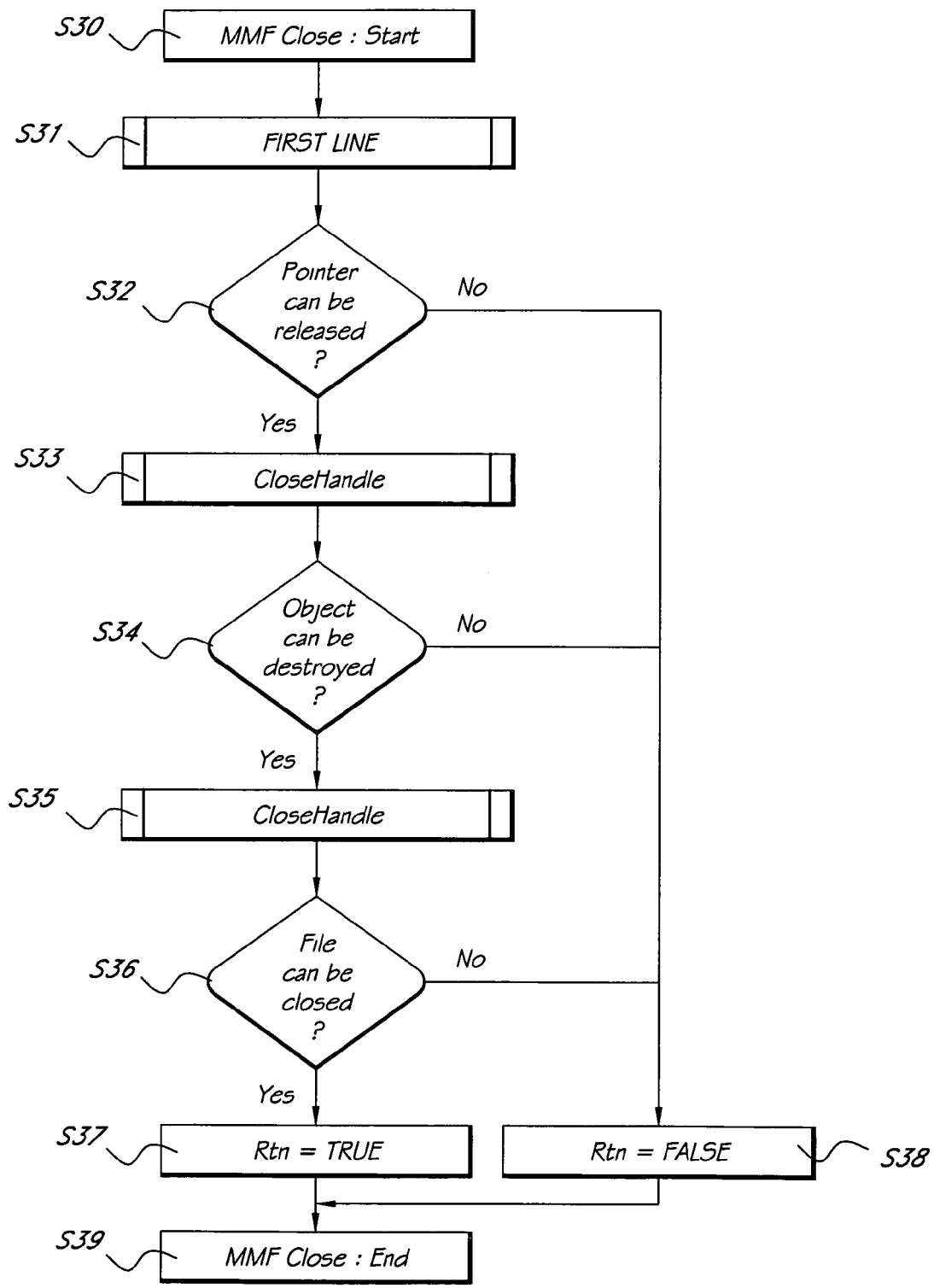
FIG. 3 is a flowchart showing features of MMF Close subroutine of MMF software running within the semiconductor manufacturing apparatus and the analyzing system according to one embodiment of the present invention.
Figure 4:
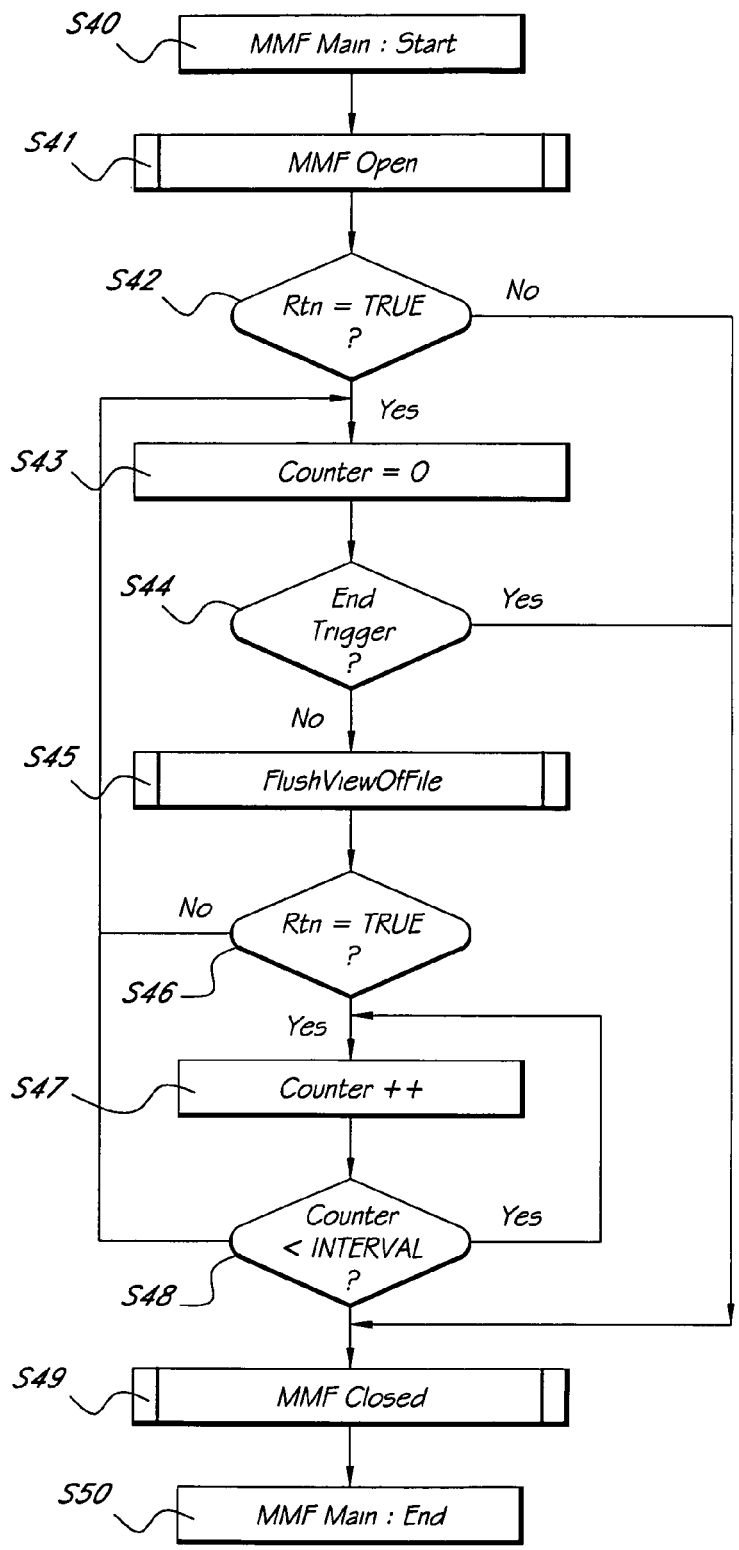
FIG. 4 is a flowchart showing features of main function in MMF software running within the semiconductor manufacturing apparatus and the analyzing system according to one embodiment of the present invention.

Additionally, in one embodiment, the MMF Write software 10 and the MMF Read software 11 differ only in arguments taken by API functions described below, and their implementation configuration is essentially the same as shown in FIG. 2, FIG. 3 and FIG. 4.

FIG. 2, FIG. 3 and FIG. 4 show an implementation example of the MMF Write software and the MMF Read software, but the present invention is not limited thereto.

FIG. 2 shows a flowchart of the MMF Open subroutine which opens a file in the MMF format. Step S21 is the CreateFIle function of the above-mentioned API, which opens a targeted file. Here, if opening the file is successful by the decision in Step S22, the process proceeds to the next step S23; if fails, the subroutine ends in Step S28 by setting 'FALSE' as a return value Rtn of the subroutine. Step S23 is the CreateFileMapping function of the above-mentioned API, which creates a file mapping object in a targeted file.

Here, if creation of an object is successful by the decision in Step S24, the process proceeds to Step S25; if fails, the subroutine ends in Step S28 by setting 'FALSE' as a return value Rtn of the subroutine. Step S25 is the MapViewOfFile function of the above-mentioned API, which specifies a mapping area in a targeted file and writes data to the targeted file. Here, acquisition of the head pointer in a file area is successful by the decision in Step S26, the subroutine ends in Step S28 by setting 'TRUE' as a return value Rtn of the subroutine. If fails, the subroutine ends in Step S28 by setting 'FALSE' as a return value Rtn of the subroutine.

FIG. 3 shows a flowchart of the MMF Close subroutine which closes a file in the MMF format. Step S31 is the UnmapViewOfFile function of the above-mentioned API, which cancels file mapping specified by the MMF Open function shown in FIG. 2. Here, if specification of a file pointer can be canceled by the decision in Step S32, the process proceeds to the next step S33; if fails, the subroutine ends in Step S38 by setting 'FALSE' as a return value Rtn of the subroutine. Step S33 is the CloseHandle function of the above-mentioned API, which nullifies the file mapping object specified by the MMF Open function shown in FIG. 2. Here, if nullification of the object is successful by the decision in Step S34, the process proceeds to Step S35; if fails, the subroutine ends in Step S38 by setting 'FALSE' as a return value Rtn of the subroutine. In Step S35, the CloseHandle function is called again, the file opened by the MMF Open function shown in FIG. 2 is closed.

Here, if closing the file is successful by the decision in Step S36, the subroutine ends in Step S37 by setting 'TRUE' as a return value Rtn of the subroutine; if fails, the subroutine ends in Step S38 by setting 'FALSE' as a return value Rtn of the subroutine.

FIG. 4 shows the main function of the MMF software. Subsequently to the start-up step in Step S40, the MMF Open subroutine is called in Step S41. The MMF Open subroutine is as described by referring to FIG. 2. In Step S42, whether a return value of the MMF Open subroutine is 'TRUE' or 'FALSE' is determined. If the return value is TRUE, the process proceeds to Step S43; if the return value is FALSE, the process proceeds to Step S49. In Step S43, '0' is set in a variable counter. The decision in Step S44 is to confirm whether a trigger for ending the software is placed or not. If the trigger is placed, the process proceeds to Step S49; if the trigger is not placed, the process proceeds to Step S45. Step S45 is the FlushViewOfFile function of the above-mentioned API, which writes data to a file.

Additionally, the FlushViewOFFile function of this API is required only in the MMF Write software 10, and is not required in the MMF Read software 11. Whether a return value of the FlushViewOfFile function is 'TRUE' or 'FALSE' is determined in Step S46. If the return value is TRUE, the process proceeds to Step S47; if the return value is FALSE, the process returns to Step S43. In Step S47, the variable counter is incremented. In the decision in Step S48, whether a value of the variable counter exceeds a fixed value INTERVAL or not is decided. If the value exceeds INTERVAL, the process returns to Step S43, and Write to File is executed again. In other words, the fixed value INTERVAL is a set point of a file write period. If the value does not exceed INTERVAL, the process returns to Step S47, and the variable counter is incremented again. Step S49 to which the process proceeds when the end trigger is placed is the MMF Close subroutine described by referring to FIG. 3. Here, the file is closed and the main function ends.

With the above, respective processes of file mapping, open, close of the MMF software implemented in this embodiment are managed by a file input/output portion of Microsoft's operating system. Consequently, stable data transfer can be implemented without placing a burden on the control software 4 in the semiconductor manufacturing apparatus 1 or the analyzing software 9 in the analyzing system 8.

Furthermore, as a method for ensuring data quality in file transfer by the MMF software, there is a method of inserting counter information to be incremented for every Write to File in a file transferred between the MMF Write software 10 and the MMF Read software 11. As counter information, the variable counter in the main function of the MMF software shown in FIG. 4 may be used. Additionally, only the MMF Write software 10 needs to have the above-mentioned counter increment; there is no need for the MMF Read software 11 to have this feature.

Figure 5:
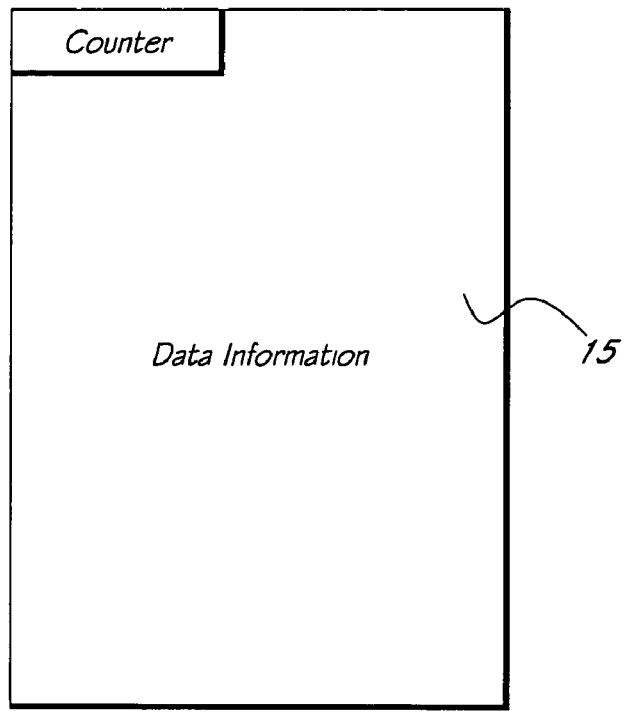
FIG. 5 is a figure showing one configuration example of a transfer data block in a data transfer method in one embodiment of the present invention.

One example of inserting counter information is shown in FIG. 5. In this example, counter information is inserted in a transfer data block 15 at its head. Because counter information is incremented for every data block transfer, change in the counter information is observed by the MMF Read software 11 continuously. If there is no change in counter information for a given number of times, it can be determined that abnormality of some sort has occurred in a communication cable or the MMF Write software 10, and that data created after updating of the counter information has been stopped is not reliable.

Figure 6:
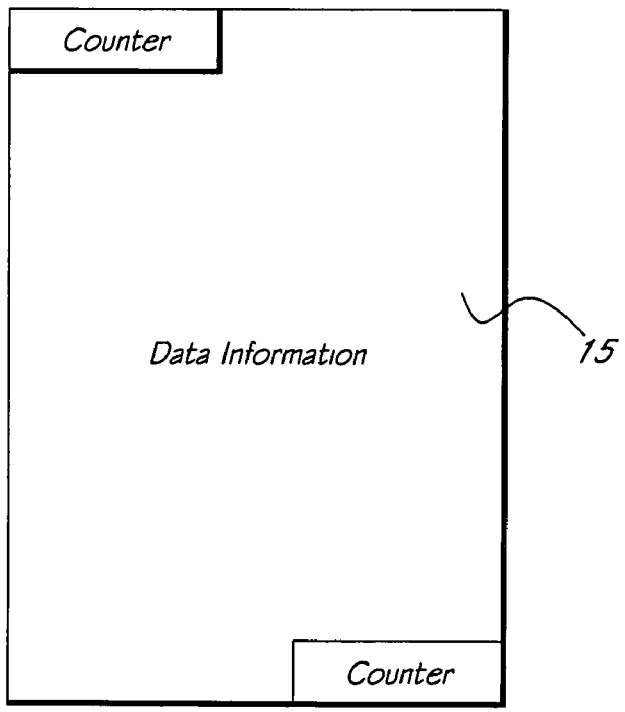
FIG. 6 is a figure showing a configuration example of a transfer data block in a data transfer method in one embodiment of the present invention, which is different from the one shown in FIG. 6.

Additionally, an alternative example of inserting counter information is shown in FIG. 6. In this example, counter information is inserted in a transfer data block 15 at its head and at its end. It is preferred that the counter information at the head and at the end refers to the same variable. If the MMF Read software 11 detects different states at the head and at the end of the data block, it can be determined that data is not reliable because it is transferred in the middle of write operation.

With the above, by adding counter information to the data block transfer communication method using the MMF software, data reliability can be ensured.

In the above, the embodiments were described using a semiconductor manufacturing apparatus as an example of a control apparatus on which the MMF software operates. Apparatuses, to which the system with reduced data transfer load capability according to the present invention applies, however, are not limited to semiconductor manufacturing apparatuses. Any control apparatuses to which signals from sensors and measuring instruments are inputted are included; for example, liquid crystal manufacturing apparatuses, magnetic disk manufacturing apparatuses, etc. are certainly included.

Embodiments of the present invention were described above. The present invention includes aspects described below.

1) A control apparatus and a signal analyzing system, which comprise software for transferring input signal data inputted to the control apparatus to the signal analyzing system, which is characterized in that the software transfers data by a method of transferring a data block from the control apparatus to the signal analyzing system.

2) In the control apparatus and the signal analyzing system described in 1) above, which is characterized in that the software transfers data by a method of transferring a data block having information on input signal data and counter information from the control apparatus to the signal analyzing system.

3) In the control apparatus and the signal analyzing system described in 1) above, which is characterized in that the software transfers data by a memory-mapped file method.

4) In the control apparatus and the signal analyzing system described in 2) above, which is characterized in that the counter information is inserted at least in one place in the transfer data block; from the counter information, abnormality in communication between the control apparatus and the signal analyzing system is detected.

5) In the control apparatus and the signal analyzing system described in 2) above, which is characterized in that the counter information is inserted in two places, at the head and at the end of the transfer data block; from the counter information, a data block transferred in the middle of data block write is detected in data block transfer between the control apparatus and the signal analyzing system.

What is claimed is:

1. A signal analyzing system comprising:
a control side computer containing a control unit configured to receive input signal data and provide an output to a control apparatus, said control side computer further containing a control signal data blocking unit configured to map information in a data analyzing area of the input signal data, in a control side address space of virtual memory as a control signal data block and transfer the control signal data block to a physical file via a network; and
an analyzing side computer containing the physical file and an analytic signal data blocking unit configured to create map the control signal data block in the physical file, in an analyzing side address space of virtual memory as an analytic signal data block for signal analysis use, said analyzing side computer further containing a signal analyzing unit configured to analyze the input signal data based on the analytic signal data block.

2. The signal analyzing system according to claim 1, wherein said control signal data blocking unit and said analytic signal data blocking unit each comprise a common data blocking application software program.

3. The signal analyzing system according to claim 1, wherein said control signal data blocking unit writes said transferred control signal data block into the physical file within said analytic signal data blocking unit, and the analytic signal data blocking unit reads in said analytic signal data block from the physical file.

4. The signal analyzing system according to claim 1, wherein a memory-mapped file is used for said control signal data block and said analytic signal data block.

5. The signal analyzing system according to claim 1, wherein said control signal data block has information on said input signal data and counter information.

6. The signal analyzing system according to claim 5, wherein said counter information is given by said control signal data blocking unit and is incremented every time said control signal data block is created.

7. The signal analyzing system according to claim 5, wherein said counter information is inserted at least in one place in said control signal data block, wherein said analytic signal data blocking unit detects change in said counter information, from which change abnormality in communication between said control signal data blocking unit and said analytic signal data blocking unit is detected.

8. The signal analyzing system according to claim 5, wherein said counter information is inserted in two places, at a head and at an end of said control signal data block, wherein said analytic signal data blocking unit detects change in said counter information at the head and at the end, from which change abnormality in communication between said control signal data blocking unit and said analytic signal data blocking unit is detected.

9. The signal analyzing system according to claim 8, wherein said counter information at the head and at the end has the same variable.

10. The signal analyzing system according to claim 1, wherein said control signal data blocking unit and said analytic signal data blocking unit are called at every given time period.

11. A manufacturing apparatus system comprising:
a signal input portion,
the signal analyzing system according to claim 1, which receives input signal data from said signal input portion, and
a control apparatus controlled by output signals from said control unit of said signal analyzing system.

12. The manufacturing apparatus system according to claim 11, which is a semiconductor manufacturing apparatus comprising as said control apparatuses a temperature controller inside a reactor, a pressure regulator, a gas flow rate controller, and a transfer robot.

13. A signal analyzing method comprising the steps of:
receiving input signal data for a control apparatus;
mapping, by a first computer, information in a data analyzing area of said input signal data, in a first address space of virtual memory as a control signal data block;
transferring, by the first computer, the control signal data block to a physical file via a network;
mapping, by a second computer, the control signal data block in the physical file, in a second address space of virtual memory as an analytic signal data block for signal analysis use; and
analyzing said input signal data based on said analytic signal data block.

14. The signal analyzing method according to claim 13, wherein said analytic signal data block is created by writing said transferred control signal data block into the physical file, and by reading in said analytic signal data block from the physical file.

15. The signal analyzing method according to claim 13, wherein a memory-mapped file is used for said control signal data block and said analytic signal data block.

16. The signal analyzing method according to claim 13, wherein to said control signal data block, information on said input signal data and counter information are given.

17. The signal analyzing method according to claim 16, wherein said counter information is incremented every time said control signal data block is created.

18. The signal analyzing method according to claim 16, wherein said counter information is inserted at least in one place in said control signal data block, wherein change in said counter information in said analytic signal data block created from said control signal data block is detected, based on which change, communication abnormality is detected.

19. The signal analyzing method according to claim 16, wherein said counter information is inserted in two places, at the head and at the end of said control signal data block, wherein change in said counter information in said analytic signal data block created from said control signal data block is detected, based on which change, communication abnormality is detected.

20. The signal analyzing method according to claim 19, wherein said counter information at the head and at the end has the same variable.

21. The signal analyzing method according to claim 13, wherein the steps of creating said control signal data block and creating said analytic signal data block are called at every given time period.

22. The signal analyzing method according to claim 13, wherein said control apparatuses comprise a temperature controller inside a reactor, a pressure regulator, a gas flow rate controller, and a transfer robot in a semiconductor manufacturing apparatus, wherein input signal data are input signals inputted to respective control apparatuses.

* * * * *

UNITED STATES PATENT AND TRADEMARK OFFICE
CERTIFICATE OF CORRECTION

| | |
|---|---|
| PATENT NO. | : 7,899,557 B2 |
| APPLICATION NO. | : 11/069599 |
| DATED | : March 1, 2011 |
| INVENTOR(S) | : Takizawa et al. |

It is certified that error appears in the above-identified patent and that said Letters Patent is hereby corrected as shown below:

At column 8, line 15, please remove "111" and insert therefore, --11--.

At column 9, line 9, please remove "B;" and insert therefore, --B--.

At column 12, line 41, in Claim 1, please remove "to create" and insert therefore, --to--.

Signed and Sealed this
Twentieth Day of December, 2011

David J. Kappos
*Director of the United States Patent and Trademark Office*